(12) United States Patent
Yasuda

(10) Patent No.: US 6,486,488 B1
(45) Date of Patent: Nov. 26, 2002

(54) APPARATUS AND METHOD FOR READING RADIATION IMAGES

(75) Inventor: Hiroaki Yasuda, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/531,217

(22) Filed: Mar. 20, 2000

(30) Foreign Application Priority Data

Mar. 19, 1999 (JP) .......................................... 11-075821

(51) Int. Cl.[7] .............................................. G03B 42/08
(52) U.S. Cl. ...................................................... 250/584
(58) Field of Search ................................. 250/584, 587, 250/484.5

(56) References Cited

U.S. PATENT DOCUMENTS

| 4,258,264 A | | 3/1981 | Kotera et al. ................ 250/585 |
| 5,420,441 A | * | 5/1995 | Newman et al. ......... 250/587 X |
| 6,265,720 B1 | * | 7/2001 | Yamazaki et al. ...... 250/370.09 |

FOREIGN PATENT DOCUMENTS

JP          56-11395          2/1981

* cited by examiner

Primary Examiner—Constantine Hannaher
(74) Attorney, Agent, or Firm—Sughrue Mion, PLLC

(57) ABSTRACT

The radiation image reading apparatus includes a reading device of a radiation image recorded in a radiation recording medium, a dose detecting device which detects a dose of radiation applied to record the radiation image, and a computing device by which linearity in radiation image reading is calculated using a plurality of radiation images with varying doses of radiation that have been read, and using detected doses of radiation applied to record the respective radiation images. The radiation image reading method is executed in the apparatus. The apparatus and method can check its linearity by a simple procedure and can adjust the linearity in accordance with the result of checking. The apparatus and method enable consistent outputting of satisfactory diagnostic images with the appropriate contrast. Therefore, the apparatus and method are suitable for use with a radiation imaging system typically using a phosphor sheet.

16 Claims, 2 Drawing Sheets

APPARATUS AND METHOD FOR READING RADIATION IMAGES

BACKGROUND OF THE INVENTION

This invention relates to the field of technology in the apparatus and the method for reading radiation images that are typically used in diagnostic radiology. More particularly, the invention relates to an apparatus and a method for reading radiation images that are adapted for detection of the linearity in image reading by a simple procedure.

A system for diagnostic radiology using a stimulable phosphor has been commercialized as exemplified by CR (Computed Radiography) such as FCR (Fuji Computed Radiography manufactured by Fuji Photo Film Co., Ltd.). When illuminated with a radiation (e.g. X-rays, α-rays, β-rays, γ-rays, electron beams or ultraviolet rays), a stimulable phosphor accumulates a portion of the radiation energy and, upon subsequent illumination with exciting light such as visible light, the phosphor produces stimulated light emission in accordance with the accumulated energy.

In a system for diagnostic radiology using the stimulable phosphor, the radiation image of a subject such as the human body is radiographed and recorded in a sheet having a stimulable phosphor layer (hereunder referred to as a "phosphor sheet"), which is scanned two-dimensionally with exciting light to emit stimulated light which, in turn, is read photoelectrically to produce a picture signal on the basis of which the radiation image of the subject is output as a visible image on a photographic material such as a radiographic film or a display device such as a CRT (see, for example, U.S. Pat. No. 4,258,264 and Unexamined Published Japanese Patent Application (kokai) No. 11395/1981).

The system using a stimulable phosphor has many advantages and its current use in the area of medical diagnosis is well anticipated to extend to non-medical fields such as the detection of flaws or cracks in industrial products. For example, the transmitted radiation image of round bars and steel pipes may be reproduced in the manner just described above. Since a damaged area absorbs less radiation than the sound area, it comes out darker than the surrounding area of the reproduced image, thus enabling the detection of the flaw or crack that cannot be seen from the outside.

To perform correct diagnosis and detection by means of the radiation imaging system, the subject radiographed and recorded in the phosphor sheet must be reproduced to give the correct image. In the radiation imaging system, the signal obtained by reading the radiation image usually receives processing such as A/D conversion and log conversion to produce digital image data for the radiographed and recorded radiation image. To reproduce the correct image, the image reading apparatus must maintain the intended linearity. In other words, the dose of radiation to which the radiation recording medium such as the phosphor sheet has been exposed during radiation imaging (which is hereunder sometimes referred to as the "exposed dose") must have a linear (1:1) correspondence with the image data obtained by the image reading process.

The linearity of the image reading apparatus is one of the important characteristics for ensuring that the image that has been read is correctly reproduced as a visible image. If the linearity changes, inconveniences occur as exemplified by the change in the contrast of the reproduced image and this leads to an error in diagnosis by a system for diagnostic radiology.

SUMMARY OF THE INVENTION

It is therefore a first object of the present invention to provide a radiation image reading apparatus that is suitable for use with a radiation imaging system typically using a phosphor sheet, that is capable of checking for linearity by a simple procedure, with an optional capability of linearity adjustment in accordance with the result of checking, and which enables consistent outputting of diagnostic images with appropriate contrast.

A second object of the present invention is to provide a radiation image reading method that is executed simply and easily in the above described radiation image reading apparatus.

This first object of the invention can be attained by a radiation image reading apparatus comprising a reading device of a radiation image recorded in a radiation recording medium, a dose detecting device which detects a dose of radiation applied to record the radiation image in the radiation recording medium and a computing device by which linearity in radiation image reading is calculated using a plurality of radiation images with varying doses of radiation that have been read by the reading device, as well as the doses of radiation applied to record the respective radiation images and which have been detected by the dose detecting device.

Preferably, the radiation recording medium has the plurality of radiation images with varying the doses of radiation recorded therein by split recording. In another preferred embodiment, the radiation recording medium has the plurality of radiation images with varying the doses of radiation recorded therein using at least one filter having a known radiation transmittance. Preferably, the at least one filter is a radiation filter in a form of a step wedge that transmits a radiation. Preferably, the radiation filter in the form of the step wedge transmits the radiation by varying degrees of 50%, 20% and 5%.

In yet another preferred embodiment, the apparatus further comprises a correction device that corrects for the linearity in accordance with a result of the linearity calculation by the computing device.

Preferably, a difference between the dose of radiation in the plurality of the radiation images is in a range of from 1:3 to 1:1000 in terms of a ratio. Preferably, when image data of the radiation image is antilogarithm data reverted to a linear state, the linearity is expressed as a ratio in the image data divided a ratio in exposed dose and if the calculated linearity is outside a range of from 0.8 to 1.2 the correction device corrects for the linearity.

Preferably, when image data $Q0$ and $Q1$ of the radiation images are log converted density data having a 4-digit dynamic range assigned to 10 bits and are read from the radiation images recorded by applying the doses $X0$ and $X1$ of radiation, respectively, the linearity is expressed by a following equation and if the calculated linearity is outside a range of from 0.8 to 1.2 the correction device corrects for the linearity.

$$\text{the linearity} = \{(Q1-Q0)/256\}/\log(X1/X0)$$

Preferably, the dose detecting device is a dosimeter for measuring the dose of radiation applied to record the radiation image. Preferably, the radiation recording medium is a stimulable phosphor sheet.

The second object of the invention can be attained by a radiation image reading method comprising the steps of detecting doses of radiation applied to record the respective radiation images in at least one radiation recording medium by varying the doses of radiation, reading the radiation images recorded in the at least one radiation recording medium and calculating linearity in radiation image reading using a plurality of radiation images with varying the doses of radiation that have been read, as well as the doses of radiation applied to record the respective radiation images and which have been detected.

Preferably, the plurality of radiation images are recorded in the at least one radiation recording medium by split recording. Preferably, the plurality of radiation images are recorded in the at least one radiation recording medium using at least one filter having a known radiation transmittance.

In the preferred embodiment, the method further comprises the steps of correcting for the linearity in accordance with a result of the linearity calculation by the computing device. Preferably, a difference between the dose of radiation in the plurality of the radiation images is in a range of from 1:3 to 1:1000 in terms of a ratio. Preferably, when image data of the radiation image is antilogarithm data reverted to a linear state, the linearity is expressed as a ratio in the image data divided a ratio in exposed dose and if the calculated linearity is outside a range of from 0.8 to 1.2 the linearity is corrected.

Preferably, when image data $Q0$ and $Q1$ of the radiation images are log converted density data having a 4-digit dynamic range assigned to 10 bits and are read from the radiation images recorded by applying the doses $X0$ and $X1$ of radiation, respectively, the linearity is expressed by a following equation and if the calculated linearity is outside a range of from 0.8 to 1.2 the linearity is corrected.

$$\text{the linearity} = \{(Q1-Q0)/256\}/\log(X1/X0)$$

Preferably, the doses of radiation applied to record the radiation images are measured by a dosimeter. Preferably, the at least one radiation recording medium is a stimulable phosphor sheet.

DETAILED DESCRIPTION OF THE INVENTION

The radiation image reading apparatus and the radiation image reading method of the invention are now described in detail with reference to the preferred embodiments shown in the accompanying drawings.

Figure 1:
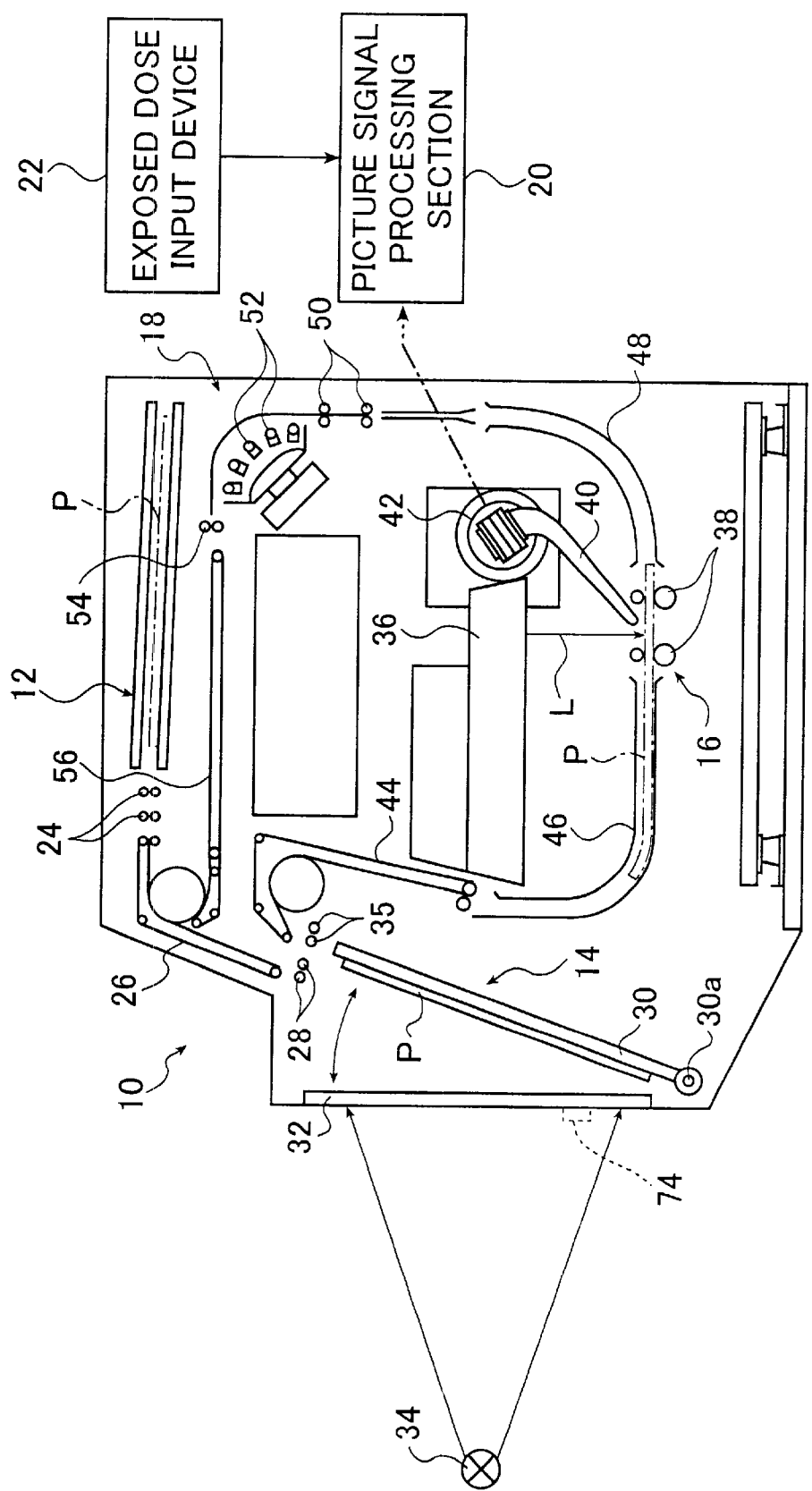
FIG. 1 shows in conceptual form an embodiment of the radiation image reading apparatus of the invention.

FIG. 1 shows in conceptual form an exemplary radiation image recording and reading apparatus using the radiation image reading apparatus of the invention executing the radiation image reading method of the invention. The radiation image recording and reading apparatus indicated by 10 in FIG. 1 (which is hereunder referred to as "recording/reading apparatus") is the heart of a system for diagnostic radiology using the aforementioned (stimulable) phosphor sheet and its basic components are a stand-by section 12 of the phosphor sheet P, a radiographing and recording section (hereunder referred to as "recording section") 14, a reading section 16, an erase section 18, a picture signal processing section (hereunder referred to as "processing section") 20 and an exposed dose input device (hereunder referred to as "dose input device") 22.

The phosphor sheet P in a non-exposed state (with no radiation image radiographed and recorded) is usually placed in the stand-by section 12 and to be prepared for radiographing and recording, it is transported to the recording section 14 by means of transport roller pairs 24, a transport device 26 having rollers and an endless belt, and a transport roller pair 28.

The recording section 14 comprises a holder (radiographic cassette holder) 30 of the phosphor sheet P that can pivot about a shaft 30a at the bottom end, a radiographing and recording plate (hereunder referred to as "recording plate") 32 and a radiation source 34.

When the phosphor sheet P has been transported to the recording section 14 by passage through the transport roller pair 28, the holder 30 retains it and then pivots about the shaft 30a counterclockwise (see the two-headed arrow) until it is brought into intimate contact with the recording plate 32 (on the side opposite to the subject).

Subsequently, the radiation source 34 issues a radiation (X-rays) to radiograph (accumulate and record) a radiation image in the phosphor sheet P.

At the end of radiographing and recording, the holder 30 pivots clockwise so that the phosphor sheet P is detached from the recording plate 32; thereafter, the phosphor sheet P is lifted upwards by a suitable moving device (not shown) to be pinched by a transport roller pair 35. The phosphor sheet P is further transported by a transport device 44 having an endless belt and rollers and a guide 46 until it is sent to auxiliary scanning (transport) roller pairs 38 in the reading section 16.

Besides the roller pairs 38, the reading section 16 has scanning optics 36, an optical guide 40 and a photomultiplier tube (PMT) 42. In the reading section 16, the phosphor sheet P is transported in an auxiliary scanning direction (to the right side of FIG. 1) as it is scanned two-dimensionally with exciting light L issued from the scanning optics 36 that is deflected in a main scanning direction (normal to the paper) which crosses the auxiliary scanning direction at right angles.

Being scanned with the exciting light L, the phosphor sheet P emits stimulated light in accordance with the accumulated and recorded radiation image. The stimulated light travels through the optical guide 40, has any unwanted components rejected by a filter, is launched into the photomultiplier tube 42 and subjected to photoelectric reading to produce a picture signal for the radiation image, which is then output to the processing section 20.

The phosphor sheet P from which the radiation image has been read is transported by means of a guide 48, transport roller pairs 50 and so forth into the erase section 18, where it is illuminated with erase light from erase lamps 52 so that any residual radiation image is erased to revert the phosphor sheet P to a non-exposed state. The phosphor sheet P is then transported into the stand-by section 12 by means of a transport roller pair 54, transport devices 56 and 26 each having an endless belt and rollers, and the transport roller pairs 24.

Figure 2:
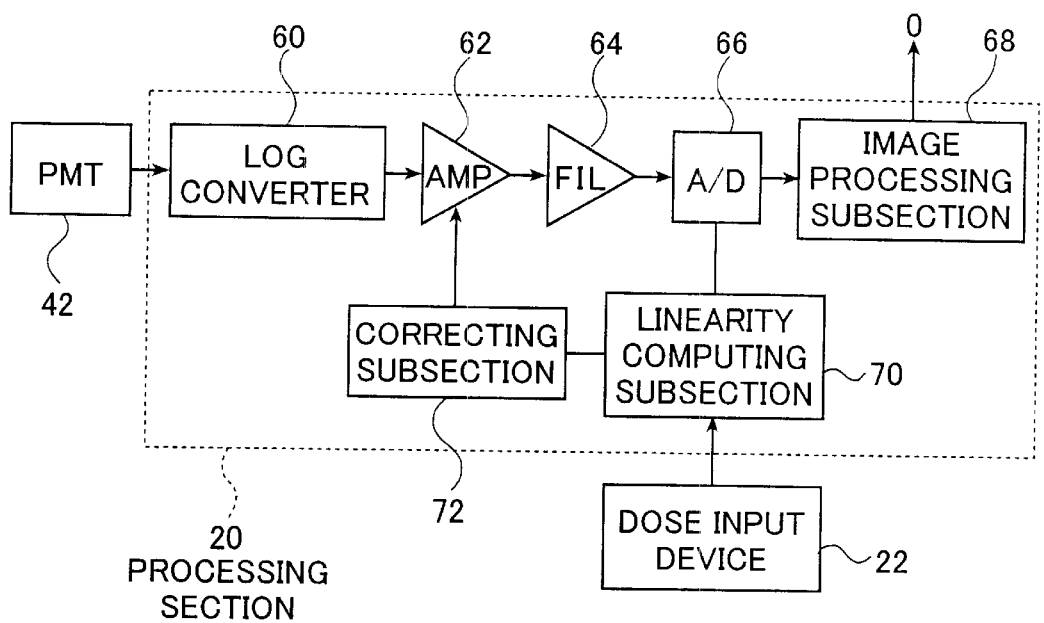
FIG. 2 is a block diagram of the picture signal processing section of the radiation image reading apparatus shown in FIG. 1.

As FIG. 2 shows, the processing section 20 comprises a log converter 60, a variable gain amplifier (AMP) 62, an antialiasing filter (FIL) 64, an A/D (analog/digital) converter 66, an image processing subsection 68, a linearity computing subsection 70 and a correcting subsection 72. The linearity computing subsection 70 is connected to the dose input device 22.

In the ordinary radiation image reading mode, the picture signal for radiation image that is output from the photomultiplier tube 42 is subjected to log conversion in the log converter 60, amplified in the variable gain amplifier 62, has the aliasing high-frequency component removed by the antialiasing filter 64 and converted to digital image data by the A/D converter 66. In the illustrated case, the log converted image signal of a four-digit dynamic range is assigned to 10 bits by the A/D converter 66 and then converted to a digital image data.

The digital image data is forwarded to the image processing subsection 68 where it receives specified image processing steps such as tone adjustment, density correction and sharpening. The processed image data is delivered to an output section O, where it is displayed by a display device such as a CRT (cathode-ray tube) or output as a hard copy by a printer.

The linearity computing subsection 70 and the correcting subsection 72, as well as the dose input device 22 check for the linearity in the reading of radiation images with the recording/reading apparatus 10 and adjust the gain of the variable gain amplifier 62 in accordance with the result of the checking.

On the pages that follow, the radiation image reading apparatus of the invention is discussed in greater detail by describing an example of how linearity checking and correction are performed in the recording/reading apparatus 10.

Assume that an instruction for executing linearity check is entered by mode selection or the like. As already mentioned, the unexposed phosphor sheet P in the recording/reading apparatus 10 is transported from the stand-by section 12 to the recording section 14 and brought into intimate contact with the recording plate 32. A dosimeter (shown in the doted lines) 74 for measuring exposed dose is set on the recording plate 32.

Then, with the dosimeter 74 being exposed to the same dose of radiation as at least the image area of the phosphor sheet P which is to be sampled for linearity checking, the radiation source 34 is driven to radiograph and record a radiation image in the phosphor sheet P while monitoring the exposed dose with the dosimeter 74.

Upon completion of the radiographing and recording of a radiation image, as mentioned above, the phosphor sheet P is transported to the reading section 16, where it is scanned two-dimensionally with exciting light L to emit stimulated light in accordance with the accumulated and recorded radiation image. The stimulated light emission travels through the optical guide 40, read photoelectrically by the photomultiplier tube 42 and sent to the processing section 20 as a picture signal for the radiation image.

Since the dosimeter 74 indicates the dose of radiation applied to the phosphor sheet P during the radiographing and recording of the radiation image, the operator reads the dose of radiation and supplies it to the dose input device 22 which is a dose detection device. The dose input device 22 may be any known input device such as a keyboard or a mouse. Alternatively, the dosimeter 74 and the dose input device 22 (or the linearity computing subsection 70) may be connected by a known connection device so that the dose input device 22 detects the exposed dose automatically.

As mentioned above, the phosphor sheet P from which the radiation image has been read is transported to the erase section 18, has the residual radiation image erased and sent to the stand-by section 12 as an unexposed phosphor sheet P.

As in the already-described ordinary radiation image reading mode, the picture signal sent to the processing section 20 is log converted in the log converter 60, amplified in the variable gain amplifier 64, converted to digital image data in the A/D converter 66 and then sent to the linearity computing subsection 70. The dose of radiation supplied to the dose input device 22 is also sent to the linearity computing subsection 70.

Subsequently, in the embodiment under consideration, the dose of radiation to be applied to the phosphor sheet P during the radiographing and recording of a radiation image is varied and the above-described procedure is repeated in a completely identical manner, namely, a radiation image is radiographed and recorded, the radiographed and recorded radiation image is read, the dose of radiation applied during image radiographing and recording is measured and input to the dose input device 22. As a result, a plurality of radiation images are produced with varying doses of radiation.

In order to ensure correct linearity checking in the embodiment under consideration, the same phosphor sheet P having no individual differences is preferably used in two radiation image radiographing (recording) and reading cycles. In order to avoid any adverse effect of the fading of the phosphor sheet P (i.e., it emits a decreasing quantity of stimulated light over time), the period between the radiographing (recording) and reading times is preferably adjusted to be constant in the two cycles. It is also preferred to apply a constant voltage on the imaging tube in the radiation source 34.

In the present invention, the difference between the doses of radiation applied to produce a plurality of radiation images is not limited to any particular value but it is preferably in the range of from about 1:3 to about 1:1,000, more preferably from about 1:10 to about 1:100 in terms of the ratio.

In the linearity computing subsection 70, image data that are representative of the respective radiation images (the image areas to be sampled) are computed from the image data supplied from the A/D converter 66 and the thus computed representative image data and the exposed doses associated with the respective image data (radiation images) are used to compute the linearity in image reading by the recording/reading apparatus 10.

Preferred examples of the image data that are representative of the radiation images include the average, median and modal values of the image data.

Stated specifically, linearity can be expressed as the image data ratio divided by the ratio in exposed dose. If the exposed dose for the first radiation image is written as X0, its image data as Q0, the exposed dose for the second radiation image as X1 and its image data as Q1, linearity can be calculated by the following equation:

$$\text{Linearity} = (Q1/Q0)/(X1/X0)$$

where Q0 and Q1 are antilogarithm image data.

The closer to unity is the value calculated by this equation, the better the linearity in image reading.

As already mentioned for the illustrated case, the log converted picture (density) signal having a 4-digit dynamic range is assigned to 10 bits by the recording/reading apparatus 10 for producing digital image data. In view of the need to revert the digital image data to the linear state (antilogarithm), the linearity in image reading can be calculated by the following equation:

$$\text{Linearity} = \{(Q1-Q0)/256\}/\log(X1/X0)$$

where Q0 and Q1 are the log converted picture signals.

The illustrated recording/reading apparatus 10 is of a preferred embodiment, in which it has the correcting subsection 72 for correcting the linearity in image reading in accordance with the calculated linearity.

Depending on the need or if the apparatus 10 has no device for correcting linearity, the linearity calculated by the linearity computing subsection 70 may be displayed by the display device either in the apparatus 10 or in the output section O.

In view of the linearity supplied from the linearity computing subsection 70, the correcting subsection 72 determines as to whether the linearity in image reading by the apparatus 10 is appropriate or not. If it is found inappropriate, the gain (amplification factor) in the variable gain amplifier 62 is adjusted accordingly. For example, if the linearity calculated by the equation set forth above is greater than unity, the gain of the variable gain amplifier is lowered. If the calculated linearity is smaller than unity, the gain is increased.

This is not the only method of correcting linearity and other methods may be employed. In one alternative method, a LUT (look-up table) for correcting linearity by processing the digital image data may be updated in accordance with the calculated linearity.

The criterion for determining as to whether the linearity in image reading by the apparatus 10 is appropriate or not is in no way limited and may be set as appropriate for a suitable factor such as the precision required of the reading apparatus. To give just one example, linearity correction is preferably performed if the calculated linearity is outside a specified range by ±20%, in particular ±5%. Referring to the illustrated case where unity is a prescribed value of linearity, correction for linearity is preferably effected if the calculated linearity is outside the range of 0.8–1.2, in particular the range of 0.95–1.05.

In the foregoing embodiment, linearity checking is done after radiation images are radiographed and recorded with different doses of radiation in a total of two phosphor sheets P. However, this is not the sole case of the invention and split radiographing (recording) may be performed to radiograph and record a plurality of radiation images with different doses of radiation on a single phosphor sheet P before linearity checking is effected.

This is how more than one radiation image is radiographed and recorded in a single phosphor sheet P with different doses of radiation. One half the area of a phosphor sheet P (as hatched in FIG. 3) is covered with an adequate thickness of a radiation shield such as a lead plate and the uncovered area of the phosphor sheet P is illuminated with a monitored dose of radiation to radiograph and record a radiation image. Thereafter, the lead plate is removed and replaced over the other half of the phosphor sheet; the uncovered area of the phosphor sheet P is illuminated with a monitored but different dose of radiation to radiograph and record another radiation image. As a result, two radiation images are radiographed and recorded in the single phosphor sheet P but with varying doses of radiation.

The split recording (radiographing) may be manually performed by the operator who places a radiation shield in a specified area before recording (radiographing) a radiation image. Alternatively, a radiation shielding member and a device for moving it may be provided in the recording section 14 such that split recording starts automatically if an instruction for linearity checking is issued as by mode selection.

The reading section 14 reads the radiation images recorded (radiographed) in the phosphor sheet P and sends the result to the processing section 20 as a picture signal for the recorded images. As in the first embodiment, the picture signal in the processing section 20 is log converted, amplified and A/D converted to produce digital image data, which is then supplied to the linearity computing subsection 70. Using a suitable parameter such as the values of the supplied image data, the linearity computing subsection 70 separates the two radiation images, calculates image data that is representative of each radiation image and calculates linearity from the image data.

The subsequent procedure is the same as in the first embodiment and the calculated linearity is sent to the correcting subsection 72 which, depending on the need, corrects the linearity in image reading by the apparatus 10.

As will be apparent from the foregoing description, the recording (radiographing) and reading steps performed in the second embodiment are not subject to the individual differences between phosphor sheets P or their fading; therefore, the linearity of the reading apparatus can be correctly checked in a more convenient manner than in the first embodiment.

Rapidity in linearity checking is another advantage of the second embodiment since the phosphor sheet P need be submitted to just one reading step.

In a third embodiment of the invention, the linearity of the reading apparatus is checked after a plurality of radiation images are radiographed and recorded in a single phosphor sheet P with varying doses of radiation by exposure through a substance with a known radiation transmittance (which may be referred to as a "radiation filter").

Figure 3:
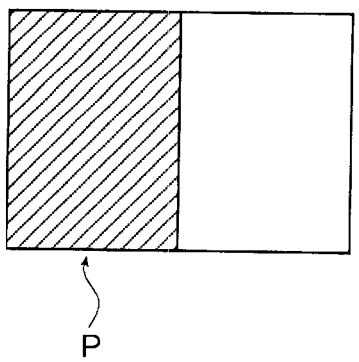
FIG. 3 illustrates a phosphor sheet that may be used to check for linearity by the radiation image reading apparatus of the invention.

This third embodiment may be implemented in the following way. As FIG. 3 shows, one half the area of a single phosphor sheet P is covered with an aluminum plate having a radiation transmittance of 10% and radiation is applied to record (radiograph) a plurality of radiation images in the single phosphor sheet P with varying doses of radiation. Monitoring the dose of radiation is not necessary in the third embodiment.

The third embodiment may be manually implemented by the operator who places a radiation filter in a specified area before recording (radiographing) a radiation image. Alternatively, a radiation filter and a device for moving it may be provided in the recording section 14 such that in response to an instruction for linearity checking that is issued as by mode selection, recording starts with the radiation filter being placed in a specified area automatically.

The reading section 14 reads the radiation images recorded in the phosphor sheet P and sends the result to the processing section 20 as a picture signal for the recorded images. As in the first and second embodiments, the picture signal in the processing section 20 is log converted, amplified and A/D converted to produce digital image data, which is then supplied to the linearity computing subsection 70. Using a suitable parameter such as the values of the supplied image data, the linearity computing subsection 70 separates the two radiation images and calculates image data that is representative of each radiation image.

In the first and second embodiments, linearity is calculated from the doses of radiation that were actually applied to the phosphor sheet or sheets P. This is not the case with the third embodiment and linearity is calculated from the radiation transmittance of the radiation filter. As already mentioned, the radiation transmittance of the radiation filter is known and can be used to determine the doses of radiation applied to produce the respective radiation images in the phosphor sheet. Therefore, in the third embodiment, the radiation transmittance of the filter is an index for the doses of radiation applied to the phosphor sheet and linearity can be calculated by the following equation:

Linearity=image data ratio/transmittance ratio for the recording (radiographing) of radiation images.

The subsequent procedure is the same as in the previous embodiments and the calculated linearity is sent to the correcting subsection 72 which, depending on the need, corrects the linearity in image reading by the apparatus 10.

As will be apparent from the above, the third embodiment has two more advantages over the second embodiment; recording (radiographing) need be performed only once and there is no need to use a dosimeter.

In the third embodiment, a plurality of radiation images may be radiographed and recorded with varying doses of radiation by using a radiation filter in the form of a step wedge that transmits a radiation by varying degrees such as 50%, 20% and 5%. Alternatively, a radiation filter assembly including two or more radiation filters may be used instead of the radiation filter in the form of the step wedge.

While the radiation image reading apparatus and the radiation image reading method of the invention have been described above in detail, the invention is by no means limited to the three embodiments and it should be understood that various improvements and modifications may be made without departing from the spirit and scope of the invention. For example, instead of checking for the linearity of the reading apparatus using two radiation images radiographed and recorded with different doses of radiation, three or more radiation images may be radiographed and recorded with varying doses of radiation and the image data for those radiation images and the doses of radiation applied to radiograph and record them are used to calculate the linearity (gradient) in image reading by a suitable method such as the method of least squares.

As described above in detail, the radiation image reading apparatus and the radiation image reading method of the invention can check and optionally adjust its linearity by a simple procedure. Therefore, if the apparatus and the method are used with a system for diagnostic radiology, its linearity is kept at an appropriate level to achieve consistent outputting of satisfactory diagnostic images having the appropriate contrast.

What is claimed is:

1. A radiation image reading apparatus, comprising:
    a reading device operative to read a plurality of radiation images recorded in a radiation recording medium;
    a dose detecting device operative to detect varying doses of radiation received while recording respective ones of the plurality of radiation images in said radiation recording medium;
    a computing device operative to calculate linearity in said radiation image reading using information obtained from said plurality of radiation images with varying doses of radiation that have been read by said reading device, and using said detected doses of radiation; and
    a correction device that corrects for the linearity in accordance with a result of the linearity calculation by said computing device,
    wherein said radiation recording medium has the plurality of radiation images, with varying doses of radiation, recorded therein by split recording.

2. The apparatus according to claim 1, wherein said radiation recording medium has the plurality of radiation images, with varying doses of radiation, recorded therein using at least one filter having a known radiation transmittance.

3. The apparatus according to claim 2, wherein said at least one filter is a radiation filter in a form of a step wedge that transmits a radiation.

4. The apparatus according to claim 3, wherein said radiation filter transmits the radiation by varying degrees of 50%, 20% and 5%.

5. The apparatus according to claim 1, wherein a difference between the dose of radiation in the plurality of the radiation images is in a range of from 1:3 to 1:1000 in terms of a ratio.

6. The apparatus according to claim 1, wherein, when image data of the radiation image is antilogarithm data reverted to a linear state, said linearity is expressed as a ratio in the image data of at least two of said plurality of images divided by a ratio in exposed dose for said at least two of said plurality of images, and if said expressed linearity is outside a range of from 0.8 to 1.2 said correction device corrects for the linearity.

7. The apparatus according to claim 1, wherein, when image data $Q0$ and $Q1$ of the radiation images are log converted density data having a 4-digit dynamic range assigned to 10 bits and are read from the radiation images recorded by applying the doses $X0$ and $X1$ of radiation, respectively, said linearity is expressed by a following equation and if the calculated linearity is outside a range of from 0.8 to 1.2 said correction device corrects for the linearity, where $$\text{the linearity} = \{(Q1-Q0)/256\}/\log(X1/X0).$$

8. The apparatus according to claim 1, wherein said dose detecting device is a dosimeter for measuring the dose of radiation applied to record the radiation image.

9. The apparatus according to claim 1, wherein said radiation recording medium is a stimulable phosphor sheet.

10. A radiation image reading method, comprising:
    detecting doses of radiation received during recordings of ones of a plurality of radiation images, said recordings being done in at least one radiation recording medium by varying applied doses of radiation that correspond to said ones of said plurality of images;
    reading the radiation images recorded in the at least one radiation recording medium and obtaining dosage information for each of the read radiation images;
    calculating linearity in radiation image reading using said dosage information from said plurality of radiation images and using detected values from said detecting of doses of radiation; and
    correcting for the linearity in accordance with a result of the linearity calculating,
    wherein said plurality of radiation images are recorded in said at least one radiation recording medium by split recording.

11. The method according to claim 10, wherein said plurality of radiation images are recorded in said at least one radiation recording medium using at least one filter having a known radiation transmittance.

12. The method according to claim 10, wherein a difference between the doses of radiation in the plurality of the radiation images is in a range of from 1:3 to 1:1000 in terms of a ratio.

13. The method according to claim 10, wherein, when image data of the radiation image is antilogarithm data reverted to a linear state, said linearity is expressed as a ratio in the image data of at least two of said plurality of images divided by a ratio in exposed dose for said at least two of said plurality of images, and if said expressed linearity is outside a range of from 0.8 to 1.2 the linearity is corrected.

14. The method according to claim 10, wherein, when image data $Q0$ and $Q1$ of the radiation images are log converted density data having a 4-digit dynamic range assigned to 10 bits and are read from the radiation images recorded by applying the doses $X0$ and $X1$ of radiation, respectively, said linearity is expressed by a following equation and if the calculated linearity is outside a range of from 0.8 to 1.2 the linearity is corrected, where the linearity=$\{(Q1-Q0)/256\}/\log(X1/X0)$.

15. The method according to claim 10, wherein said detected values of said doses of radiation applied to record the radiation images are obtained from a dosimeter.

16. The method according to claim 10, wherein said at least one radiation recording medium is a stimulable phosphor sheet.

* * * * *